United States Patent
Dong et al.

(10) Patent No.: US 10,126,600 B2
(45) Date of Patent: Nov. 13, 2018

(54) DISPLAY SUBSTRATE AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Tingze Dong, Beijing (CN); Dawei Zhang, Beijing (CN); Lu Tian, Beijing (CN); Jun Mo, Beijing (CN); Yuguang Fan, Beijing (CN); Jian Li, Beijing (CN); Hongpeng Li, Beijing (CN); Jingpeng Li, Beijing (CN); Sunghun Song, Beijing (CN); Wei Wang, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 198 days.

(21) Appl. No.: 14/900,381

(22) PCT Filed: Apr. 16, 2015

(86) PCT No.: PCT/CN2015/076709
§ 371 (c)(1),
(2) Date: Dec. 21, 2015

(87) PCT Pub. No.: WO2016/112594
PCT Pub. Date: Jul. 21, 2016

(65) Prior Publication Data
US 2016/0370658 A1    Dec. 22, 2016

(30) Foreign Application Priority Data

Jan. 15, 2015 (CN) .......................... 2015 1 0020938

(51) Int. Cl.
*G02F 1/1337*  (2006.01)
*G02F 1/1345*  (2006.01)
(Continued)

(52) U.S. Cl.
CPC ...... *G02F 1/133784* (2013.01); *G02F 1/1345* (2013.01); *G02F 1/13394* (2013.01);
(Continued)

(58) Field of Classification Search
CPC .......... G02F 1/133784; G02F 1/13439; G02F 1/134327; G02F 1/13394; G02F 1/133345;
(Continued)

(56) References Cited

U.S. PATENT DOCUMENTS

2004/0238818 A1* 12/2004 Kim ................... H01L 22/34
257/48
2005/0248710 A1* 11/2005 Hirosue ............ G02F 1/133351
349/151
(Continued)

FOREIGN PATENT DOCUMENTS

CN    201464594 U    5/2010
CN    102902127 A    1/2013
(Continued)

OTHER PUBLICATIONS

Office Action from corresponding Chinese Application No. 201510020938.4, dated Jan. 6, 2017 (6 pages).
(Continued)

*Primary Examiner* — Edward Glick
*Assistant Examiner* — Shan Liu
(74) *Attorney, Agent, or Firm* — Harness, Dickey & Pierce, P.L.C.

(57) ABSTRACT

The present application provides a display substrate and a display device. The display substrate includes a display
(Continued)

region and a non-display region, a surface layer of the display region being rubbed to form an alignment layer, the non-display region being provided with a test electrode, the test electrode including multiple strip-shaped first sub-electrodes, the extending direction of the first sub-electrodes being the same with the direction of the rubbing for forming the alignment layer. By dividing the test electrode into multiple strip-shaped first sub-electrodes and the extending direction of the first sub-electrodes (i.e., the length direction) being the same as the rubbing direction of the rubbing to form an alignment layer, the display substrate can make the alignment of the alignment layer formed by the rubbing consistent and uniform, thereby avoiding the occurrence of Rubbing Mura when the alignment layer is formed by the rubbing.

19 Claims, 3 Drawing Sheets

(51) Int. Cl.
  *G02F 1/1362* (2006.01)
  *G02F 1/1333* (2006.01)
  *G02F 1/1343* (2006.01)
  *G02F 1/1339* (2006.01)
(52) U.S. Cl.
  CPC .... *G02F 1/13439* (2013.01); *G02F 1/133345* (2013.01); *G02F 1/134327* (2013.01); *G02F 1/136286* (2013.01); *G02F 2001/133388* (2013.01); *G02F 2001/136254* (2013.01); *G02F 2201/122* (2013.01)
(58) Field of Classification Search
  CPC .. G02F 1/1337; G02F 1/1343; G02F 1/13378; G02F 1/133788; G02F 1/133707; G02F 1/133753; G02F 1/3775; G02F 1/133719; G02F 1/0027; G02F 1/141; G02F 2001/133738; G02F 2001/133769; G02F 2001/133776; G02F 2001/13787; G02F 2001/133746; G02F 2001/133749; G02F 2001/133773; G02F 2001/3548; G02F 2001/133742; G02F 2001/133761; G02F 1/0121; G02F 1/0327; G02F 1/076; G02F 1/133; G02F 1/13306; G02F 1/1345; G02F 1/13452; G02F 1/13454; G02F 1/13458; G02F 2001/133388; G02F 2001/133612; G02F 2001/13456; G09G 2300/0495; G09G 2300/0486; G09G 2300/0426; G09G 2300/0408; G09G 3/3655; G09G 3/3674; G09G 3/3685; G09G 2290/00; G09G 2320/0223; G09G 2300/0421; G09G 3/36; H01L 21/02211; H01L 23/48; H01L 23/49572; H01L 2224/50; H01L 2224/79; H01L 2224/86; H01L 2225/06579; H01L 2225/107; H01L 24/50; H05K 3/389; C08F 259/08; C09K 2019/548
  USPC .................................. 349/123–126, 149–152
  See application file for complete search history.

(56) References Cited

U.S. PATENT DOCUMENTS

| 2006/0012740 A1* | 1/2006 | Kuan ................ G02F 1/133784 349/126 |
| 2007/0097306 A1* | 5/2007 | Jung ..................... G02F 1/1345 349/143 |
| 2007/0273820 A1* | 11/2007 | Chen ................... G02F 1/13452 349/150 |
| 2011/0234963 A1* | 9/2011 | Chien ................. G02F 1/13454 349/149 |
| 2011/0244752 A1* | 10/2011 | Lee ..................... G02F 1/13452 445/24 |
| 2013/0027282 A1* | 1/2013 | Kimura ............... G02F 1/13452 345/80 |
| 2013/0038806 A1* | 2/2013 | Tae ........................ G09G 3/006 349/43 |
| 2015/0062478 A1* | 3/2015 | Zhao ..................... G02F 1/1309 349/54 |
| 2015/0226989 A1* | 8/2015 | Lee ................... G02F 1/133512 349/47 |
| 2015/0243242 A1* | 8/2015 | Eom ........................ G09G 3/20 345/211 |

FOREIGN PATENT DOCUMENTS

| CN | 104280939 A | 1/2015 |
| CN | 104516163 A | 4/2015 |
| CN | 204331237 U | 5/2015 |
| KR | 20130115832 A | 10/2013 |
| KR | 20140001488 A | 1/2014 |
| KR | 101378211 B1 | 3/2014 |
| KR | 101405629 B1 | 6/2014 |

OTHER PUBLICATIONS

Written Opinion of the International Searching Authority from corresponding PCT Application No. PCT/CN2015/076709, dated Oct. 9, 2015 (4 pages).

* cited by examiner

DISPLAY SUBSTRATE AND DISPLAY DEVICE

TECHNICAL FIELD

The present application relates to a field of display technology, specifically, to a display substrate and a display device.

BACKGROUND ART

Liquid Crystal Display (LCD) devices have become mainstream products among current flat panel display devices because of small size, low power consumption and no radiation. A liquid crystal display panel is a key component in a liquid crystal display device, and a liquid crystal display panel includes a paired array substrate and a color film substrate, as well as a liquid crystal layer arranged between the array substrate and the color film substrate.

In order to make liquid crystals in the liquid crystal display panel keep a specific alignment when having no power, alignment layers are to be formed on the surfaces of the array substrate and of the color film substrate, wherein the surfaces are facing to each other. Grooves with specific alignment are formed on the alignment layers and the grooves are usually formed by the rubbing of rubbing cloth.

In the rubbing process to form the alignment layer of the array substrate, Rubbing Mura (also known as rubbing marks, which refer to bad consistency of grooves in the alignment layer formed by using rubbing cloth to rub the surface of the array substrate, i.e., inconsistency of groove alignments of the alignment layer) is often easily generated, and seriously affects the display quality of the liquid crystal display panel.

Through tests, it is found that the Rubbing Mura is not caused by the rubbing cloth, but is caused by the wiring design of the peripheral circuit of the array substrate. Test electrodes, for testing whether a test display panel is normal or good, are usually laid out in non-display regions of the array substrate, and the test electrodes are used to transmit a test signal into the inside of the display panel to perform the test. In order for the smooth transmission of the test signal, the test electrodes are usually designed as a bulk with larger area, while peripheral wiring of the test electrodes is usually designed as thinner line-shape, which leads to certain surface morphology differences of the test electrode and its peripheral wiring.

In the process of performing rubbing alignment with rubbing cloth, the rubbing cloth usually starts rubbing from a side of the array substrate until rubbing to the relative other side of the array substrate, and since the surface morphology of the bulk test electrodes is greatly different from the surface morphology of its peripheral line wiring, the cloth hair alignment of the rubbing cloth is chaotic (i.e., inconsistent alignment), thereby leading to inconsistency of alignment of grooves formed by the rubbing when the rubbing cloth enters a display region from a non-display region, that is, Rubbing Mura is easily generated and seriously affects the imaging quality of the liquid crystal display panel.

SUMMARY OF THE APPLICATION

With respect to the aforementioned technical problems existing in the prior art, the present application provides a display substrate and a display device. By dividing a test electrode into multiple strip-shaped first sub-electrodes, the extending direction of the first sub-electrodes being the same with the rubbing direction of an alignment layer formed by the rubbing, the display substrate can make the alignment of the alignment layer formed by the rubbing consistent and uniform, thereby avoiding the occurrence of Rubbing Mura when the alignment layer is formed by the rubbing.

The present application provides a display substrate including a display region and a non-display region, a surface layer of the display region being rubbed to form an alignment layer, the non-display region being provided with a test electrode, the test electrode including multiple strip-shaped first sub-electrodes, the extending direction of the first sub-electrodes being the same with the direction of the rubbing for forming the alignment layer.

Optionally, the widths of the multiple first sub-electrodes perpendicular to the extending direction thereof are the same, and the multiple first sub-electrodes are disposed at equal intervals.

Optionally, the non-display region is provided with a binding electrode, the binding electrode including multiple strip-shaped second sub-electrodes, the second sub-electrodes being of the same size and disposed at equal intervals, the extending direction of the second sub-electrode being the same with the rubbing direction of the rubbing for forming the alignment layer;

The width of the first sub-electrode is the same as the width of the second sub-electrode perpendicular to the extending direction thereof, and the intervals between adjacent first sub-electrodes is equal to the intervals between adjacent second sub-electrodes.

Optionally, the first sub-electrodes and the second sub-electrodes are located on a surface layer of the non-display region, and the surfaces of the first sub-electrodes are flushed with the surfaces of the second sub-electrodes.

Optionally, the first sub-electrode includes a first conductive layer, an insulating layer and a second conductive layer; the first conductive layer, the insulating layer and the second conductive layer are stacked sequentially from bottom to top; the insulating layer further extends to cover a spacing region between any two adjacent first sub-electrodes;

A via hole is provided in the region corresponding to the first conductive layer and second conductive layer in the insulating layer, the first conductive layer and the second conductive layer are electrically connected through the via hole.

Optionally, the first conductive layers of the multiple first sub-electrodes are connected through a third electrode, and/or the second conductive layers of the multiple first sub-electrodes are connected via a third electrode.

Optionally, the third electrode is strip-shaped and its extending direction is perpendicular to the extending direction of the first sub-electrode, and the width of the third electrode perpendicular to its extending direction is smaller than the width of the first sub-electrode.

Optionally, the third electrode is located at the end of or in the middle of the first sub-electrode along its extending direction.

Optionally, multiple third electrodes, spaced apart from each other, are provided.

Optionally, multiple test electrodes are provided, the multiple test electrodes are spaced apart from each other, and any spacing region between the test electrodes is provided with multiple strip-shaped spacers that are separated from each other, the extending direction of the spacer is the same as the extending direction of the first sub-electrode.

Optionally, the width of the spacer perpendicular to the extending direction thereof is equal to the width of the first sub-electrode, and the intervals between any two adjacent spacers disposed within the same spacing region between the test electrodes are the same, and the interval between adjacent spacers is equal to the interval between adjacent first sub-electrodes.

Optionally, the interval between the first sub-electrode and the spacer adjacent thereto is equal to the interval between adjacent first sub-electrodes.

Optionally, the spacer is disposed on the surface layer of the non-display region, and the surface of the spacer is flushed with the surface of the first sub-electrode.

The present application further provides a display device including the aforementioned display substrate.

The present application has the following beneficial effects: by dividing a test electrode into multiple strip-shaped first sub-electrodes, wherein the extending direction (i.e., the length direction) of the first sub-electrode is the same with the rubbing direction of the rubbing used to form an alignment layer, the display substrate provided by the present application can make the alignment of the alignment layer formed by rubbing consistent and uniform, thereby avoiding the occurrence of Rubbing Mura when the alignment layer is formed by rubbing.

By using the display substrate above, the display device provided by the present application prevents the occurrence of Rubbing Mura when the display device is displaying, thereby improving display quality of the display device.

EXPLANATIONS OF REFERENCE SIGNS 1. display region; 2. non-display region; 3. test electrode; 31. first sub-electrode; 311. first conductive layer; 312. insulating layer; 313. second conductive layer; 314. via hole; 4. binding electrode; 41. second sub-electrode; 5. third electrode; 6. spacer.

DETAILED DESCRIPTION OF THE APPLICATION

To make those skilled in the art better understand the technical solution of the application, a display substrate and a display device provided by the present application are further described below in detail in combination with the drawings and specific embodiments.

Embodiment 1

Figure 1:
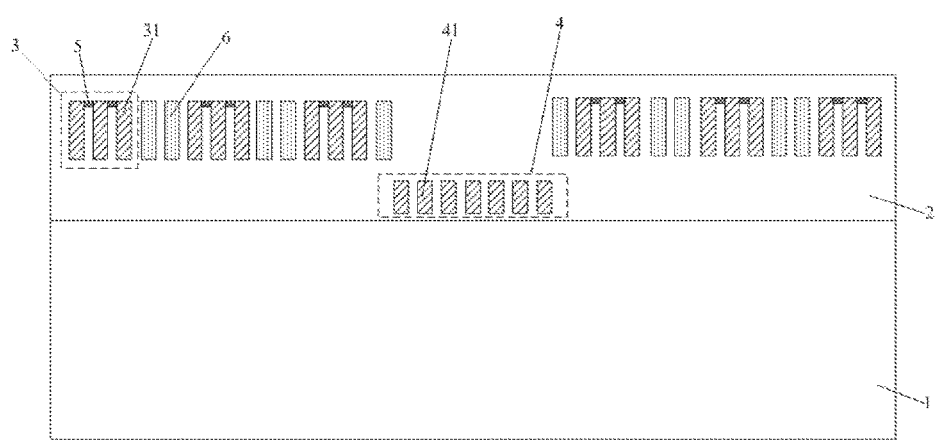
FIG. 1 is a top view of the structure of a display substrate in embodiment 1 of the present application.
Figure 6:
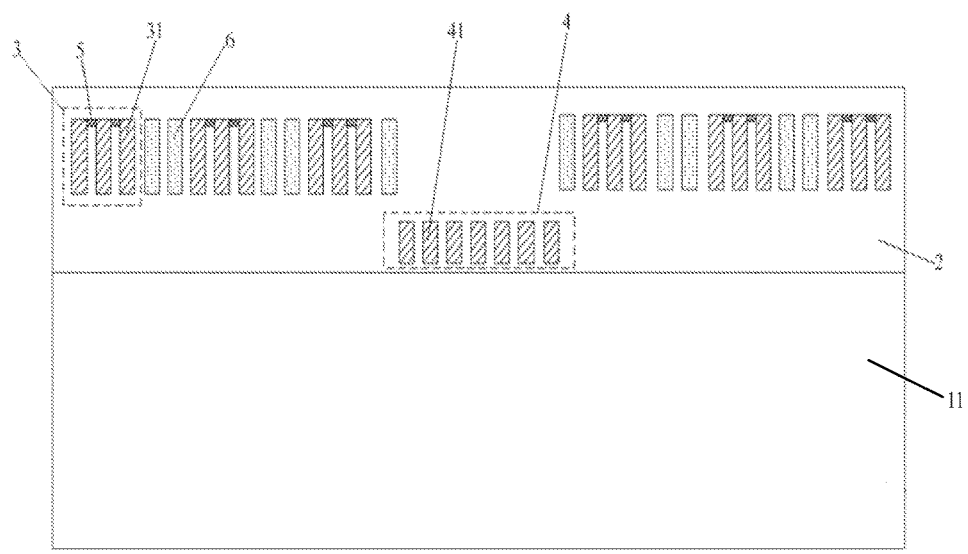
FIG. 6 is a top view of the structure of the display substrate of FIG. 1, illustrating an alignment layer.

The present embodiment provides a display substrate shown in FIG. 1, including a display region and a non-display region 2, wherein a surface layer of the display region 1 is rubbed to form an alignment layer, the non-display region 2 is provided with a test electrode 3, the test electrode 3 includes multiple strip-shaped first sub-electrodes 31, and the extending direction of the first sub-electrode 31 is the same as the direction of the rubbing of the alignment layer formed by the rubbing. The alignment layer 11 is illustrated in FIG. 6.

The test electrode 3 is divided into multiple strip-shaped first sub-electrodes 31 and the extending direction of the first sub-electrodes 31 (i.e., length direction) is the same as the direction of the rubbing of the alignment layer formed by the rubbing. This can make the alignment of the alignment layer formed by the rubbing consistent and uniform, thereby avoiding the occurrence of Rubbing Mura when the alignment layer is formed by the rubbing.

In this embodiment, the widths of the multiple first sub-electrodes 31 perpendicular to the extending direction thereof are the same, and the multiple first sub-electrodes 31 are disposed at equal intervals. Such arrangement can make the multiple first sub-electrodes 31 divided from the test electrode 3 be distributed evenly, and the evenly distributed first sub-electrodes 31 can comb the cloth hair of rubbing cloth which is used to rub to form an alignment layer and make the cloth hair of rubbing cloth distributed evenly in the same direction, so as to make the alignment layer formed by the rubbing of the rubbing cloth more uniform with the same alignment, thereby avoiding the occurrence of Rubbing Mura.

In this embodiment, the non-display region 2 is further provided with a binding electrode 4. The binding electrode 4 includes multiple strip-shaped second sub-electrodes 41 of the same size disposed at equal intervals, the extending direction (length direction) of the second sub-electrodes 41 being the same as the direction of the rubbing of the alignment layer formed by the rubbing. The width of the first sub-electrode 31 is the same as the width of the second sub-electrode 41 perpendicular to the extending direction thereof, and the intervals between adjacent said first sub-electrodes 31 is equal to the intervals between adjacent said second sub-electrodes 41. The binding electrode 4 may be disposed in a blank region not corresponding to the test electrode 3 in the rubbing direction. In the case where a spacer 6 (described later) is provided, the binding electrode 4 may be disposed in a blank region not corresponding to the test electrode 3 and the spacer 6 in the rubbing direction. Specifically, as shown in FIG. 1, in the line formed by the test electrode 3 and the spacer 6 arranged in a direction perpendicular to the rubbing direction (lateral direction), there is a blank region not provided with a test electrode 3 or spacer 6. The binding electrode 4 may be disposed in another line corresponding to the blank region.

Since the binding electrode 4 and the test electrode 3 both are disposed in the non-display region 2, and when the rubbing cloth rubs to form an alignment layer, the rubbing cloth will first start rubbing from the non-display region 2 on a side of the display substrate toward the display region 1, then the arrangement of the binding electrode 4 and the test electrode 3 in the non-display region 2 above can comb the display region 1, well before the cloth hair of the rubbing cloth rubs pass the display region 1, to make the cloth hair of the rubbing cloth distributed evenly and in the same direction, which can make the alignment of the alignment layer formed by the rubbing consistent and uniform, thereby avoiding the occurrence of Rubbing Mura.

In this embodiment, the first sub-electrodes 31 and the second sub-electrodes 41 both are located on a surface layer of the non-display region 2, and the surfaces of the first sub-electrodes 31 and of the second sub-electrodes 41 are flush. Such arrangement advantageously combs the cloth hair of the rubbing cloth consistently by the first sub-electrodes 31 and the second sub-electrodes 41, so as to make the alignment of the alignment layer formed by the rubbing of the rubbing cloth more uniform and consistent. Because if the surfaces of the first sub-electrode 31 and of the second sub-electrode 41 are not flush, the cloth hair of the rubbing cloth will have apparently different degrees of curvature when passing through the surface of the first sub-electrode 31 and the surface of the second sub-electrode 41, thereby directly leading to an alignment difference of the alignment layer formed by the rubbing of the rubbing cloth.

Figure 2:
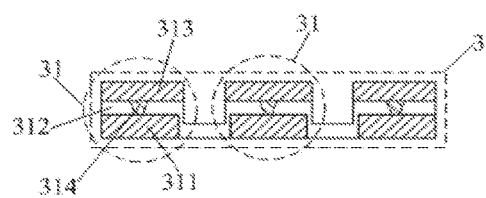
FIG. 2 is a cross-sectional view of the structure of a first sub-electrode in FIG. 1.

In this embodiment, as shown in FIG. 2, the first sub-electrode 31 includes a first conductive layer 311, an insulating layer 312 and a second conductive layer 313, the first conductive layer 311, the insulating layer 312 and the second conductive layer 313 being stacked sequentially from bottom to top, the insulating layer 312 further extending to cover a spacing region between any two adjacent the first sub-electrodes 31. Since the first conductive layer 311, the insulating layer 312 and the second conductive layer 313 are formed sequentially by a conventional patterning process layer by layer, then the spacing region between any two adjacent the first sub-electrodes 31 is finally formed as a stripe-shaped groove. The depth of the groove may be a sum of the thickness of the first conductive layer 311 and the thickness of the second conductive layer 313. The groove with such depth advantageously combs the cloth hair of the rubbing cloth well, thereby leading to a better alignment effect of the alignment layer formed by the rubbing of the rubbing cloth.

A via hole 314 is provided in the region corresponding to the first conductive layer 311 and second conductive layer 313 in the insulating layer 312, the first conductive layer 311 and the second conductive layer 313 being electrically connected to each other via the via hole 314. The first conductive layer 311 and a signal test line in the display substrate are disposed in the same layer and are electrically connected to each other, the second conductive layer 313 is disposed directly above the first conductive layer 311 for introducing an external test signal to the test signal line in the display substrate, and the provision of the via hole 314 can implement the electrical connection between the first conductive layer 311 and the second conductive layer 313.

Figure 3:
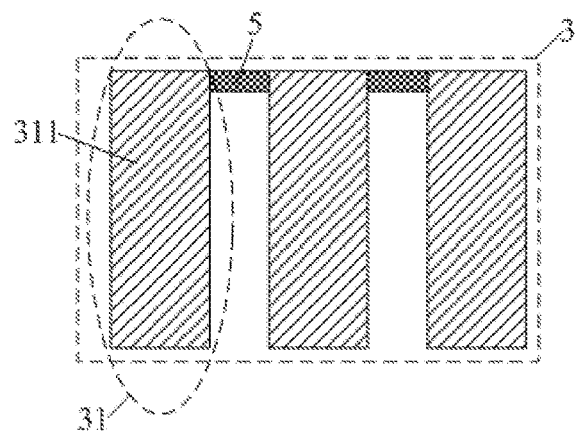
FIG. 3 is a top view of a connection structure between the first sub-electrode and a third electrode in FIG. 1.

In this embodiment, as shown in FIG. 3, the first conductive layers 311 of the multiple first sub-electrodes 31 are electrically connected therebetween via a third electrode 5, and the second conductive layers 313 of the multiple first sub-electrodes 31 are electrically connected therebetween via a third electrode 5. Wherein the third electrode 5 electrically connecting the first conductive layers 311 of the multiple first sub-electrodes 31 is disposed in the same layer with the first conductive layers 311, and the third electrode 5 electrically connecting the second conductive layers 313 of the multiple first sub-electrodes 31 is disposed in the same layer with the second conductive layers 313. The provision of the third electrode 5 can increase the cross-sectional area of the entire test electrode 3 composed of the multiple first sub-electrode 31, thereby reducing the resistance of the entire test electrode 3 and benefiting the normal input of the test signal.

It should be noted that the third electrode 5 may also connect the first conductive layers 311 of the multiple first sub-electrodes 31 together only, or connect the second conductive layers 313 of the multiple first sub-electrodes 31 together only, and this likewise can reduce the resistance of the entire test electrode 3 and benefit the normal input of the test signal.

Wherein the third electrode 5 is a stripe and its extending direction (i.e., length direction) is perpendicular to the extending direction of the first sub-electrode 31. The width of the third electrode 5 perpendicular to its extending direction is small, in order to facilitate keeping the length of the gap between the first sub-electrodes 31, so as to ensure the effect of combing cloth hair. Optionally, the width of the third electrode 5 perpendicular to its extending direction is smaller than the width of the first sub-electrode 31. Such arrangement not only can ensure that the resistance of the entire test electrode 3 is reduced, but also will not affect the combing of cloth hair of the rubbing cloth by the multiple first sub-electrodes 31, so that it still can ensure that the alignment of the alignment layer formed by the rubbing of the rubbing cloth is the same.

In this embodiment, the third electrode 5 is located at the end of the first sub-electrode 31 along its extending direction. That is, the third electrode 5 disposed in the same layer with the first conductive layers 311 connects the ends of the first conductive layers 311 together, and the third electrode 5 disposed in the same layer with the second conductive layers 313 connects the ends of the second conductive layers 313 together. The third electrode 5 connects together the ends of the first sub-electrodes 31 and can better avoid the impact on the combing of the cloth hair of the rubbing cloth from the third electrode 5 (because the extending direction of the third electrode 5 is perpendicular to the rubbing direction of the rubbing cloth).

Figure 4:
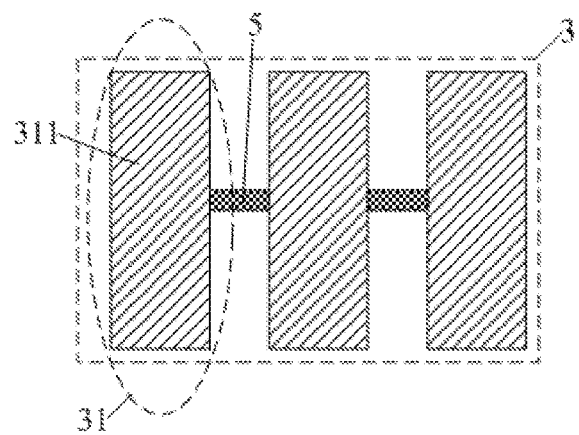
FIG. 4 is a top view of another connection structure between the first sub-electrode and the third electrode in FIG. 1.

In other embodiments, as shown in FIG. 4, the third electrode 5 may also be located in the middle of the first sub-electrode 31 along its extending direction, i.e., the third electrode 5 connects the first sub-electrodes 31 together at the position of ½ the length of the first sub-electrodes 31. Since the width of the third electrode 5 is smaller than the width of the first sub-electrode 31, the third electrode 5 does not usually have a huge impact on the combining of the cloth hair of the rubbing cloth.

In this embodiment, as shown in FIG. 1, multiple test electrodes 3 are included, the multiple test electrodes 3 are spaced apart from each other; and any spacing region between the test electrodes 3 is provided with multiple strip-shaped spacers 6 separated from each other, the extending direction of the spacer 6 is the same as the extending direction of the first sub-electrode 31. The width of the spacer 6 perpendicular to the extending direction thereof is equal to the width of the first sub-electrode 31, and the intervals between any two adjacent spacers 6 disposed within the same spacing region between the test electrodes 3 is the same and is equal to the intervals between two adjacent first sub-electrodes 31.

It should be noted that the spacer 6 may be formed by a conductive material and may also be formed by an insulating material. The spacer 6 formed by a conductive material can be formed by a single patterning process simultaneously with the first sub-electrodes 31, without additional process steps. The spacer 6 formed by an insulating material may be formed by adding an additional patterning process, and may also be formed simultaneously with other insulating layers beneath the first sub-electrodes 31.

The provision of the spacer 6 can better comb the cloth hair when the rubbing cloth passes through the spacing region between the first sub-electrodes 31, so that the alignment of the alignment layer formed in the entire display region 1 by rubbing is more consistent and uniform.

In this embodiment, the intervals between the first sub-electrode 31 and the spacer 6 adjacent thereto is equal to the intervals between two adjacent first sub-electrodes 31. Such arrangement can ensure that the cloth hair is combed evenly in the same direction when the rubbing cloth passes through the test electrode 3 and the spacer 6, so as to ensure that the alignment of the alignment layer formed by the rubbing is consistent and uniform.

Wherein, the spacer 6 is disposed on the surface layer of the non-display region 2, and the surfaces of the spacer 6 and of the first sub-electrode 31 are flushed with each other. Such arrangement can make the degree of curvature and direction of the cloth hair consistent, after the cloth hair of the rubbing cloth is combed by the first sub-electrode 31 and spacer 6, so that the alignment of the alignment layer formed by the rubbing of the rubbing cloth is consistent. The display device of this embodiment is an array substrate or a color film substrate.

Embodiment 2

Figure 5:
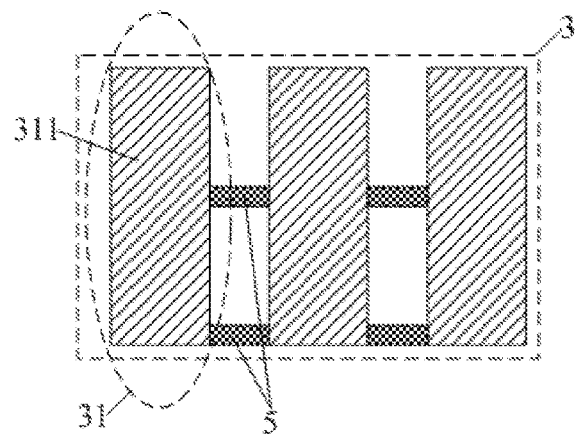
FIG. 5 is a top view of a connection structure between a first sub-electrode and a third electrode in embodiment 2 of the present application.

The present embodiment provides a display substrate, and different from Example 1, as shown in FIG. 5, there are provided multiple third electrodes 5. The multiple third electrodes 5 provided in the same gap between the first sub-electrodes 31 are spaced apart. This arrangement can enhance the electrical connection of the first sub-electrodes 31. In FIG. 5, the total number of the third electrodes 5 is slightly greater than the total number of the first sub-electrodes 31. However, optionally, the total number of the third electrode 5 is smaller than the total number of the first sub-electrode 31, so that the number of the third electrodes 5 in the same gap is smaller, thereby ensuring that the presence of the third electrode 5 does not affect the rubbing alignment effect.

Other structure of the display substrate in the present embodiment is the same as in Embodiment 1, and will not be described here.

The provision of the multiple third electrodes 5 can increase the surface area of the test electrode 3, thus facilitating the input of a test signal to the test electrode 3. For example, when the display substrate is being tested, the test electrode 3 with large surface area better facilitates a probe for introducing a test signal in reliable and effective contact with the test electrode 3. At the same time, the provision of the multiple third electrodes 5 is also capable of further reducing the resistance of the entire test electrode 3, thereby facilitating smooth input of the test signal. Further, since the width of the third electrode 5 is smaller than the width of the first sub-electrode 31, the third electrode 5 does not usually have a huge impact on the combing of the cloth hair of the rubbing cloth hair.

The advantageous effect of Embodiments 1-2 is that the display substrate provided in Embodiments 1-2 can make, by dividing the test electrode into multiple strip-shaped first sub-electrodes and the extending direction of the first sub-electrodes (i.e., the length direction) is the same as the rubbing direction of an alignment layer formed by the rubbing, the alignment of the alignment layer formed by the rubbing consistent and uniform, thereby avoiding the occurrence of Rubbing Mura when the alignment layer is formed by the rubbing.

Embodiment 3

The present embodiment provides a display device including the display substrate of any one of Embodiments 1-2.

With the display substrate of any one of Embodiments 1-2, no Rubbing Mura will occur when the display device is displaying, thereby improving the display quality of the display device.

The display device provides in the present application may be any product or component with liquid crystal display functions like a liquid crystal panel, a LCD TV, a LCD display, a mobile phone, a navigator and the like.

It is appreciated that the above embodiments are merely exemplary embodiments to illustrate the principles of the present application and the present application is not limited thereto. Those of ordinary skill in the art, without departing from the spirit and essence of the present application, may make various variants and improvements, which are also encompassed within the scope of the present application.

The invention claimed is:

1. A display substrate, comprising:
a display region; and
a non-display region, a surface layer of the display region including an alignment layer, the alignment layer including a plurality of grooves extending in a rubbing direction, the non-display region including multiple test electrodes, each test electrode including multiple strip-shaped first sub-electrodes, the multiple first sub-electrodes extending in a same direction as the rubbing direction of the alignment layer;
wherein the multiple test electrodes are spaced apart from one another, each spacing region between at least two of the test electrodes includes multiple strip-shaped spacers that are separated from one another, and each spacer extends in a same direction as the extending direction of the multiple first sub-electrodes; and
wherein each spacer comprises only insulating material.

2. The display substrate according to claim 1, wherein widths of the multiple first sub-electrodes perpendicular to the extending direction thereof are the same and the multiple first sub-electrodes are disposed at equal intervals.

3. The display substrate according to claim 2, wherein:
the non-display region further includes a binding electrode, the binding electrode includes multiple strip-shaped second sub-electrodes, the multiple second sub-electrodes have the same size and are disposed at equal intervals, and the multiple second sub-electrodes extend in a same direction as the rubbing direction of the alignment layer; and
the widths of the first sub-electrodes are the same as widths of the second sub-electrodes perpendicular to an extending direction thereof, and an interval between adjacent first sub-electrodes is equal to an interval between adjacent second sub-electrodes.

4. The display substrate according to claim 3, wherein the first sub-electrodes and the second sub-electrodes are located on a surface layer of the non-display region, and surfaces of the first sub-electrodes are flush with surfaces of the second sub-electrodes.

5. The display substrate according to claim 4, wherein widths of the spacers perpendicular to the extending direction thereof are equal to the widths of the first sub-electrodes, intervals between any two adjacent spacers disposed within the same spacing region between the test electrodes are the same, and each interval between adjacent spacers is equal to an interval between two adjacent first sub-electrodes.

6. The display substrate according to claim 5, wherein an interval between each first sub-electrode and one of the spacers adjacent thereto is equal to the interval between adjacent first sub-electrodes.

7. The display substrate according to claim 6, wherein each spacer is disposed on the surface layer of the non-display region, and the surface of each spacer is flush with the surfaces of the first sub-electrodes.

8. A display device, including the display substrate of claim 5.

9. A display device, including the display substrate of claim 4.

10. A display device, including the display substrate of claim 3.

11. A display device, including the display substrate of claim 2.

12. The display substrate according to claim 1, wherein:
each first sub-electrode includes a first conductive layer, an insulating layer and a second conductive layer;
the first conductive layer, the insulating layer and the second conductive layer are stacked sequentially from bottom to top;
the insulating layer further extends to cover a spacing region between any adjacent first sub-electrodes;
a via hole is provided in a region, corresponding to the first conductive layer and the second conductive layer, in the insulating layer; and
the first conductive layer and the second conductive layer are electrically connected through the via hole.

13. The display substrate according to claim 12, wherein the first conductive layers of the multiple first sub-electrodes are connected via a third electrode, and/or the second conductive layers of the multiple first sub-electrodes are connected via a third electrode.

14. The display substrate according to claim 13, wherein the third electrode is strip-shaped and extends in a direction perpendicular to the extending direction of the first sub-electrodes, and a width of the third electrode perpendicular to the extending direction thereof is smaller than the widths of the first sub-electrodes.

15. The display substrate according to claim 14, wherein the third electrode is located at an end of or in a middle of at least one of the first sub-electrodes along its extending direction.

16. The display substrate according to claim 14, wherein the third electrode is one of multiple third electrodes, and the multiple third electrodes are spaced apart from each other.

17. A display device, including the display substrate of claim 13.

18. A display device, including the display substrate of claim 12.

19. A display device, including the display substrate of claim 1.

* * * * *